(12) United States Patent
Khayargoli et al.

(10) Patent No.: US 11,486,534 B2
(45) Date of Patent: Nov. 1, 2022

(54) SUPPORT AND BRACKET WITH CONTROLLED ARTICULATION

(71) Applicant: Ingenio Aerospace Inc., Montreal (CA)

(72) Inventors: Praduman Khayargoli, LaSalle (CA); James Edward Bell, Outremont (CA)

(*) Notice: Subject to any disclaimer, the term of this patent is extended or adjusted under 35 U.S.C. 154(b) by 0 days.

(21) Appl. No.: 17/365,979

(22) Filed: Jul. 1, 2021

(65) Prior Publication Data
US 2022/0010922 A1 Jan. 13, 2022

Related U.S. Application Data

(60) Provisional application No. 63/049,176, filed on Jul. 8, 2020.

(51) Int. Cl.
| | |
|---|---|
| *E04G 3/00* | (2006.01) |
| *F16M 11/12* | (2006.01) |
| *G03B 17/56* | (2021.01) |
| *F16M 11/04* | (2006.01) |
| *F16M 13/02* | (2006.01) |
| *H04M 1/04* | (2006.01) |

(52) U.S. Cl.
CPC ......... *F16M 11/123* (2013.01); *F16M 11/041* (2013.01); *F16M 13/022* (2013.01); *G03B 17/561* (2013.01); *H04M 1/04* (2013.01)

(58) Field of Classification Search
CPC .. F16M 11/123; F16M 11/041; F16M 13/022; G03B 17/561; H04M 1/04
USPC ........................................................ 248/278.1
See application file for complete search history.

(56) References Cited

U.S. PATENT DOCUMENTS

| | | | |
|---|---|---|---|
| 9,749,002 B1 * | 8/2017 | Fan | H04M 1/04 |
| 10,663,104 B2 * | 5/2020 | Yang | H04B 1/3877 |
| 10,933,815 B1 * | 3/2021 | Khubani | B60R 11/0241 |
| 11,193,629 B2 * | 12/2021 | Zaikonnikov | H04M 1/04 |
| 11,218,580 B2 * | 1/2022 | Davis | F16M 11/10 |

* cited by examiner

*Primary Examiner* — Todd M Epps
(74) *Attorney, Agent, or Firm* — Anglehart et al.

(57) ABSTRACT

A bracket for mounting to a flat surface; it has a plate for fastening to the flat surface through the use of fasteners; a mounting component for fastening, at a first surface of the mounting component, to a holder for an electronic device or the electronic device; an articulation interconnecting the plate and the mounting component; at least three protrusions located between the plate and the mounting component and projecting from at least one of the plate and the second surface of the mounting component, and wherein at least one of the plate and the mounting component abuts one or more of the at least three protrusions through movement of the articulation, the at least three protrusions restricting range of motion of the mounting component provided by the articulation along the three axes.

20 Claims, 8 Drawing Sheets

SUPPORT AND BRACKET WITH CONTROLLED ARTICULATION

The present application claims priority from U.S. provisional patent application No. 63/049,176 filed on Jul. 8, 2020, incorporated herein by reference.

TECHNICAL FIELD

The present disclosure relates to brackets, and more particularly to brackets with articulations used for holding electronic devices.

BACKGROUND

Tablet and smartphone supports used in an aircraft are designed to meet certain requirements in terms of size and function. The specifications of these supports are dictated namely by the minimal space available in the aircraft, the risk of injury to passengers and personnel by objects that are protruding (e.g. when the aircraft undergoes turbulence), and general regulatory requirements pertaining to an aircraft. When a tablet or smartphone support is specifically designed for the cockpit, the limitations of the support are usually increasingly stringent, as the support may not obstruct the pilot's access to other equipment and controls.

On the other hand, a smartphone or tablet support may preferably allow for adjustment of the position of the tablet or smartphone secured thereto in order to allow the user to adjust the orientation of the smartphone or tablet. This adjustment may be preferable to improve the use of the device by the user despite the limited space available in the aircraft, namely in the cockpit of the aircraft.

SUMMARY

The present disclosure relates to a bracket with a specific articulation that is adapted to limit the range of movement of the articulation. The bracket can be attached to, or for joining to, a holder for receiving an electronic device.

The electronic device may be a smartphone, a tablet, a laptop, a television screen, etc.

Even though the present disclosure discusses the use of the bracket in connection with a computing device holder (e.g. a tablet computer), where the computing device holder may be preferably used in an aircraft, namely the cockpit of an aircraft, it will be understood that the bracket may be used in other cases, such as a mount for a speaker, a camera, etc.

Moreover, the articulation of the bracket and the protrusions used to limit the range of motion provided by the articulation as described herein may not be limited to bracket applications, but can be used for other functions where an articulation may be present and where controlling a range of motion is sought, such as in an articulation of a robotic arm, where the articulation could be connected to a mechanical component of the robotic arm (an end effector or segment that is joined to an end effector, etc.)

The present disclosure relates to an electronic device support and bracket allowing for controlled adjustment of the position of an electronic device attached thereto.

The freedom of motion provided by the bracket is provided along the three axes, yet the range of motion along at least some of the axes (e.g. the tilt and/or pan angle in one or both directions) is restricted. The restriction of the range of motion is achieved using protrusions that are positioned at the interface between two parts of the bracket (e.g. the plate and the mounting component) that are interconnected through an articulation that enables the freedom of motion. The protrusions are positioned around the articulation, their position and height determined as a function of the degree of restriction in the range of motion sought.

The protrusions allow for precise and controlled limitations of the range of motion in different directions along the different axes. The height of the protrusions can be set, where some of the protrusions may be of a different height than the other protrusions (e.g. each of the protrusions may be of a different height) depending on the range of motion that is desired.

The bracket with a precisely controlled range of motion may be suitable for uses in locations with limited space, such as the cockpit of an aircraft, where an excessive range of motion of the bracket may result in the holder moving into a position that can hinder the pilot's access to certain controls or visual displays located in the cockpit. The controlled range of motion allows the pilot to quickly reposition the holder (e.g. and the tablet secured thereto) by applying a force to the holder that is connected to the mounting component, where the protrusions prevent the holder from undergoing excessive motion that could jeopardize the performance of the pilot in the cockpit of the aircraft.

Moreover, the articulation of the bracket is integrated into the plate and the mounting component of the bracket (i.e. a first portion of the articulation is integrated into the plate, and a second portion of the articulation is integrated into the mounting component) thereby providing for a more compact bracket, as the articulation is not an additional part distinct from the plate and the mounting component.

A broad aspect of the present disclosure is a bracket for mounting to a flat surface. The bracket has a plate for fastening to the flat surface through the use of fasteners; a mounting component for fastening, at a first surface of the mounting component, to a holder for an electronic device; or the electronic device; an articulation interconnecting the plate and the mounting component at a second surface of the mounting component opposite the first surface, the articulation allowing for movement of the mounting component with respect to the plate along three axes; at least three protrusions located between the plate and the mounting component and projecting from at least one of the plate and the second surface of the mounting component, wherein the at least three protrusions form a polygon around the articulation, and wherein at least one of the plate and the mounting component abuts one or more of the at least three protrusions through movement of the articulation, the at least three protrusions restricting range of motion of the mounting component provided by the articulation along the three axes.

In some embodiments, the at least three protrusions may project from the plate.

In some embodiments, there may be a space between each of the protrusions of the at least three protrusions and the second surface of the mounting component when the second surface of the mounting component is parallel with the plate.

In some embodiments, the at least three protrusions may have three protrusions that form a triangle surrounding form the articulation, and/or the at least three protrusions may have four protrusions that form a parallelogram sounding the articulation.

In some embodiments, the polygon formed by the at least four protrusions may be centered around the articulation.

In some embodiments, the at least three protrusions may be posts.

In some embodiments, at least two of the at least three protrusions may be posts having a different height.

In some embodiments, the bracket may include the fasteners for fastening the plate to the flat surface.

In some embodiments, the mounting plate may be adapted to be fastened to a wall, wherein the wall is the flat surface.

In some embodiments, the articulation may be a universal joint.

In some embodiments, the mounting component may be for fastening, at the first surface of the mounting component, to the holder for an electronic device.

Another broad aspect is an electronic device support comprising the bracket as defined herein; and a holder for receiving and securing an electronic device attached or attachable to the first surface of the mounting component of the bracket, wherein movement of mounting component about the articulation causes the holder to move respectively.

In some embodiments, the holder may include a movable jaw; and a fixed jaw, wherein the movable jaw and fixed jaw form a space for receiving a tablet, and wherein the movable jaw can be adjusted to fix the tablet between the movable jaw and the fixed jaw.

In some embodiments, the at least one of the movable jaw and the fixed jaw may include an opening at a side of at least one of the movable jaw and the fixed jaw that is closest to the tablet to not cover a camera lens of the tablet.

In some embodiments, the holder may be detachable from the bracket.

In some embodiments, the first surface of the mounting component may include a slot for receiving a corresponding projection, where the projection slides into the slot of the mounting component to secure the holder to the mounting component.

Another broad aspect is a method of securing a tablet holder to a bracket that controls a range of motion of the tablet holder in at least one of the three axes comprising: securing the tablet holder to a socket of a mounting component of the bracket; adjusting the position of the tablet holder by exerting a force on the tablet holder, wherein the force causes the tablet holder, connected to the mounting component, to move in accordance with the direction of the force as a result of an articulation connected to the mounting component, wherein the moving of the tablet holder is limited by abutting one or more protrusions that limit motion of the tablet holder.

In some embodiments, the protrusions project from a plate to which the mounting component may be connected through the articulation, and wherein the moving of the tablet holder is limited by the abutting of a surface of the mounting component that faces the plate against the one or more protrusions.

In some embodiments, the protrusions may limit movement of the tablet holder along each of the three axes.

In some embodiments, the method may include clamping the tablet to the tablet holder using a fixed clamp and a movable clamp of the tablet holder, wherein one of the fixed clamp and the movable clamp may provide a space for accommodating a camera lens of the tablet, such that the one of the fixed clamp and the movable clamp may not obstruct the camera lens.

In some embodiments, the protrusions may be of different heights, thereby resulting in different ranges of motions of the tablet holder in each of the three axes.

Another broad aspect is a method of controlling the range of motion of a mechanical component connected to an articulation and provided by the articulation along three axes comprising upon a force being exerted on the mechanical component, rotating the mechanical component about the articulation in accordance with the exerted force until the mechanical component abuts one or more protrusions that surround the articulation.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to an electronic device support and bracket allowing for controlled adjustment of the position of an electronic device attached thereto.

The movement of the portion of the bracket that receives the holder or the electronic device is provided by an articulation interconnecting a plate of the bracket, for connecting the bracket to a flat surface, and a mounting component, for receiving the holder or the electronic device. The movement of the mounting component about the articulation is constrained through the use of three of more protrusions positioned around the abutment, at the interface between the plate and the surface of the mounting component that is facing the plate. As the mounting component moves about the abutment, the surface of the mounting component that faces the plate contacts the plate, movement of the mounting component thereby restricted by the protrusion. The position of the protrusions around the articulation are such that they can restrict movement along the desired axes. For instance, the protrusions may form a polygon, thereby restricting movement along all three axes.

The height, dimensions, number and position of the protrusions may vary depending on the desired restriction on movement sought for a specific configuration of the bracket.

Definitions

By "electronic device", it includes such devices as a speaker, computing device, display screen, television, camera, radar, light, an electronic flight bag (EFB), etc.

By "computing device", it includes such devices as a laptop, a tablet, a smartphone, etc.

Figure 1:
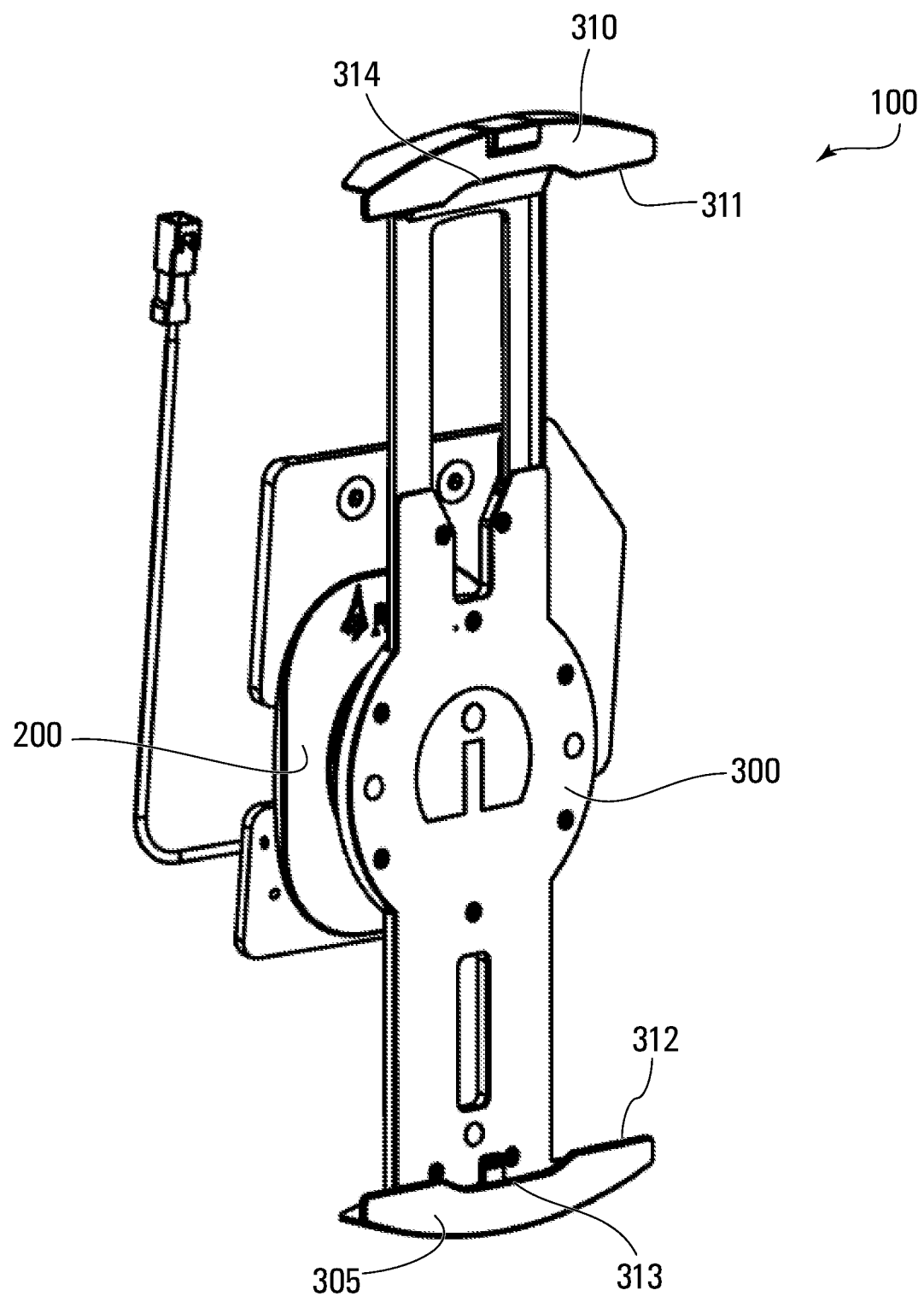
FIG. 1 is a drawing of a perspective view of an exemplary tablet support for mounting to a flat surface.

Exemplary Support for Receiving an Electronic Device:

Reference is now made to FIG. 1, illustrating an exemplary support 100 for receiving and securing a tablet in accordance with the present teachings.

It will be understood that even though FIG. 1 shows a support for receiving a tablet, the bracket described herein may be used to secure any electronic device, such as a smartphone, external screen, speaker, camera, etc., without departing from the present teachings. The example of the tablet is given for purposes of illustration.

The support may be used in an aircraft, a land vehicle, a watercraft, etc.

The support 100 has a holder 300 and a bracket 200.

The holder 300 is configured to receive and secure a tablet therein.

The holder 300 may have a first, movable jaw 310, and a second fixed jaw 305. The movable jaw 310 is opposite from the fixed jaw 305. The space between the fixed jaw 305 and the movable jaw 310 may be adjusted to accommodate the dimensions of the tablet, and once the tablet is secured between the fixed jaw 305 and the movable jaw 310, the movable jaw 310 may be moved towards (e.g. slide) the fixed jaw 305 in order to secure the tablet between the fixed jaw 305 and the movable jaw 310.

The holder 300 may have a locking mechanism to lock the position of the movable jaw 310. The locking mechanism may have a handle or switch 320, connected to the locking mechanism, where the handle or switch 320 can shift between different positions in order to lock or unlock the movable jaw 310 through the locking mechanism.

The movable jaw 310 may include on a first side 311 that is closest to the tablet when the tablet is positioned between the movable jaw 310 and the fixed jaw 305, an opening 314 for avoiding the obstruction of the camera lens of the tablet when the tablet is secured between the movable jaw 310 and the fixed jaw 305. The shape of the movable jaw 310 with the opening 314 may be that of an arc.

The fixed jaw 305 may include on a first side 312 that is closest to the tablet when the tablet is positioned between the movable jaw 310 and the fixed jaw 305, an opening 313 for avoiding to obstruct the camera lens of the tablet when the tablet is secured between the movable jaw 310 and the fixed jaw 305. The shape of the fixed jaw 305 with the opening 313 may be that of an arc.

Figure 2:
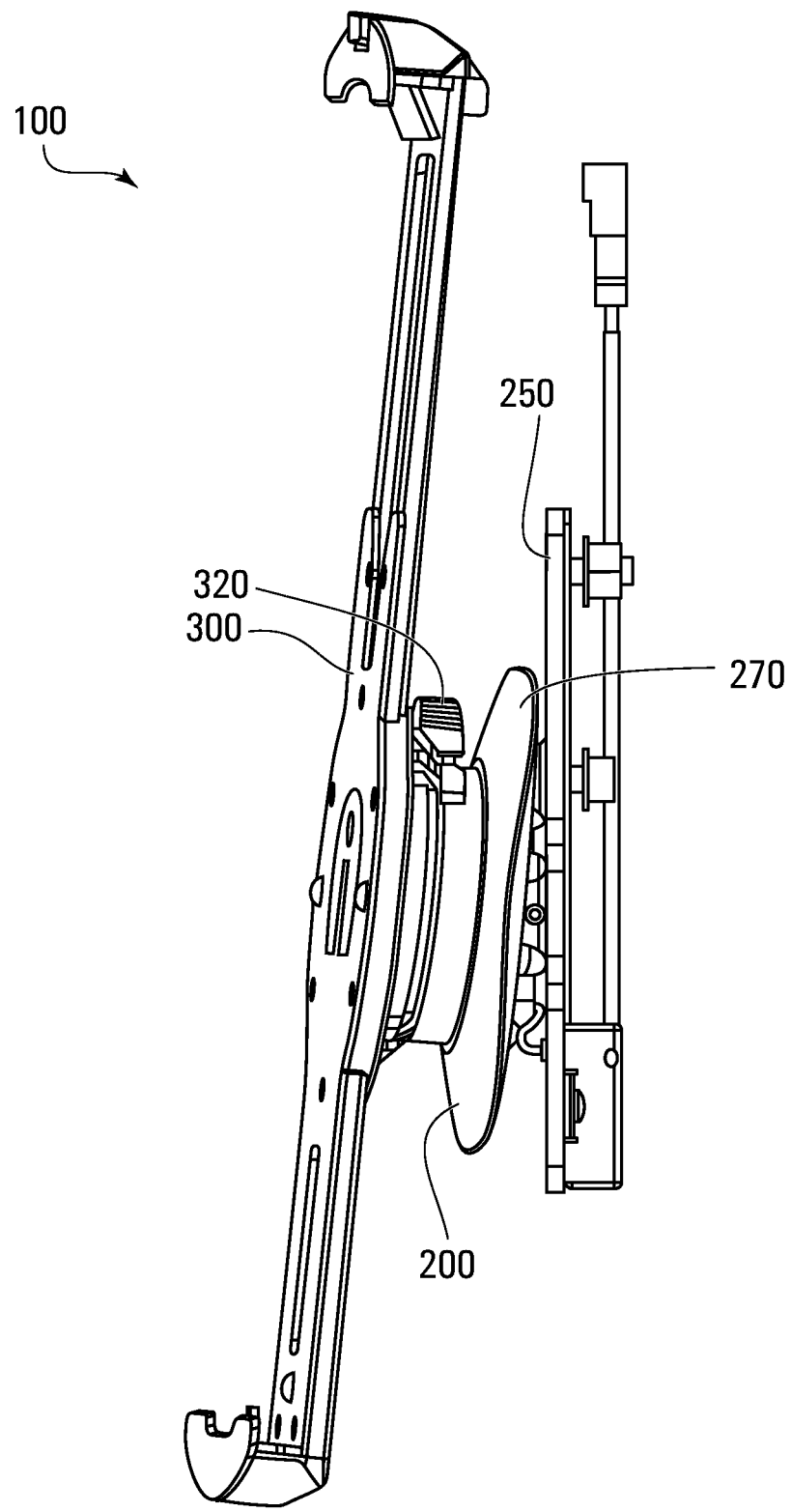
FIG. 2 is a drawing of a side view of an exemplary tablet support for mounting to a flat surface.
Figure 3:
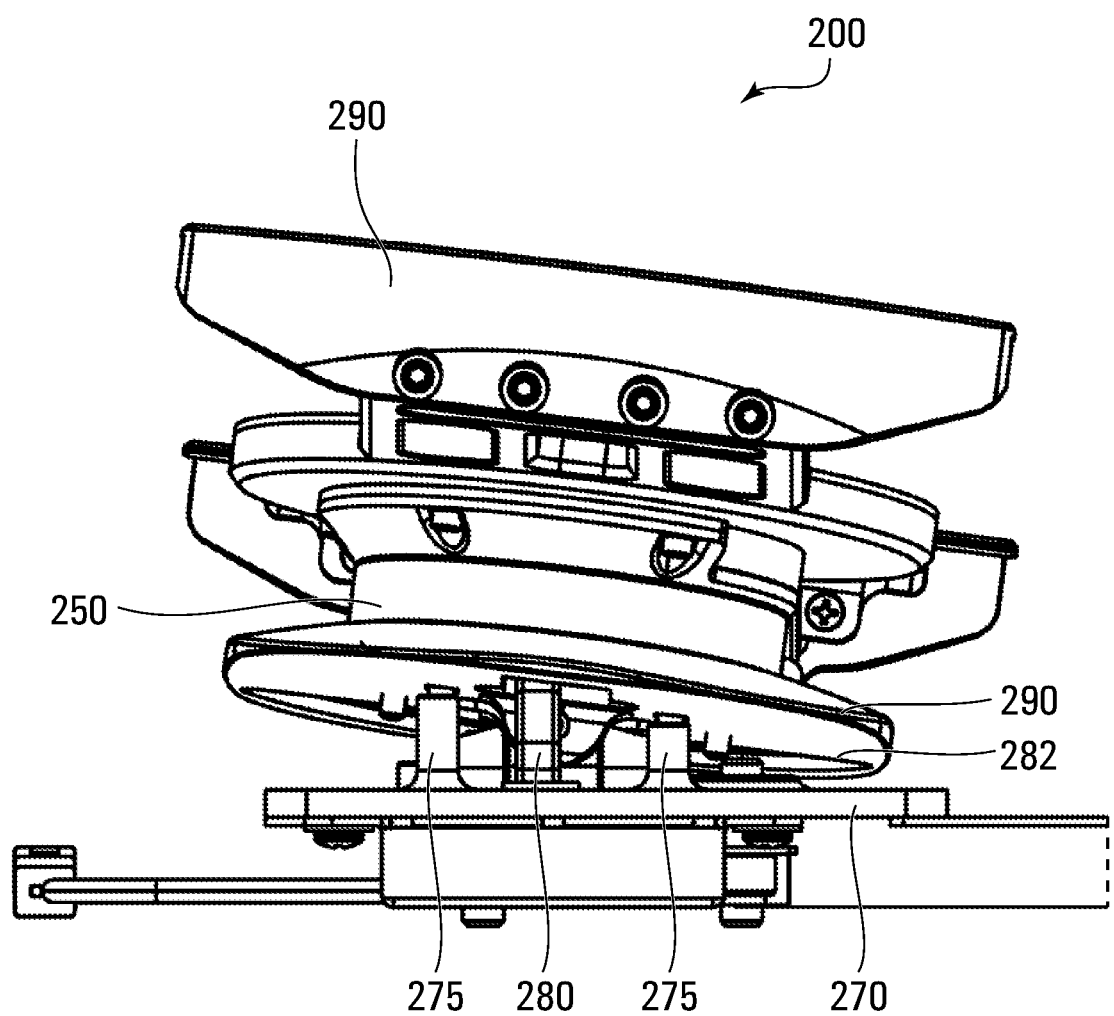
FIG. 3 is a drawing of a side view of an exemplary articulation of an exemplary tablet support.

Referring now to FIGS. 2 and 3, the bracket 200 is configured to be secured to a flat surface (e.g. a wall, a ceiling, etc.) and to attach or to be attachable to the holder 300.

The bracket 200 has a plate 250, a mounting component 270 and an articulation 280 for providing motion along the three axes (e.g. a universal joint, a ball-and-socket joint, etc.) The articulation 280 is located between a surface of the mounting component 270 that is facing the plate 250, and the plate 250. The bracket 200 may also have three or more protrusions, protruding from the plate 250 and/or a surface of the mounting component 270 that is facing the plate 250, positioned around the articulation 280.

Figure 4:
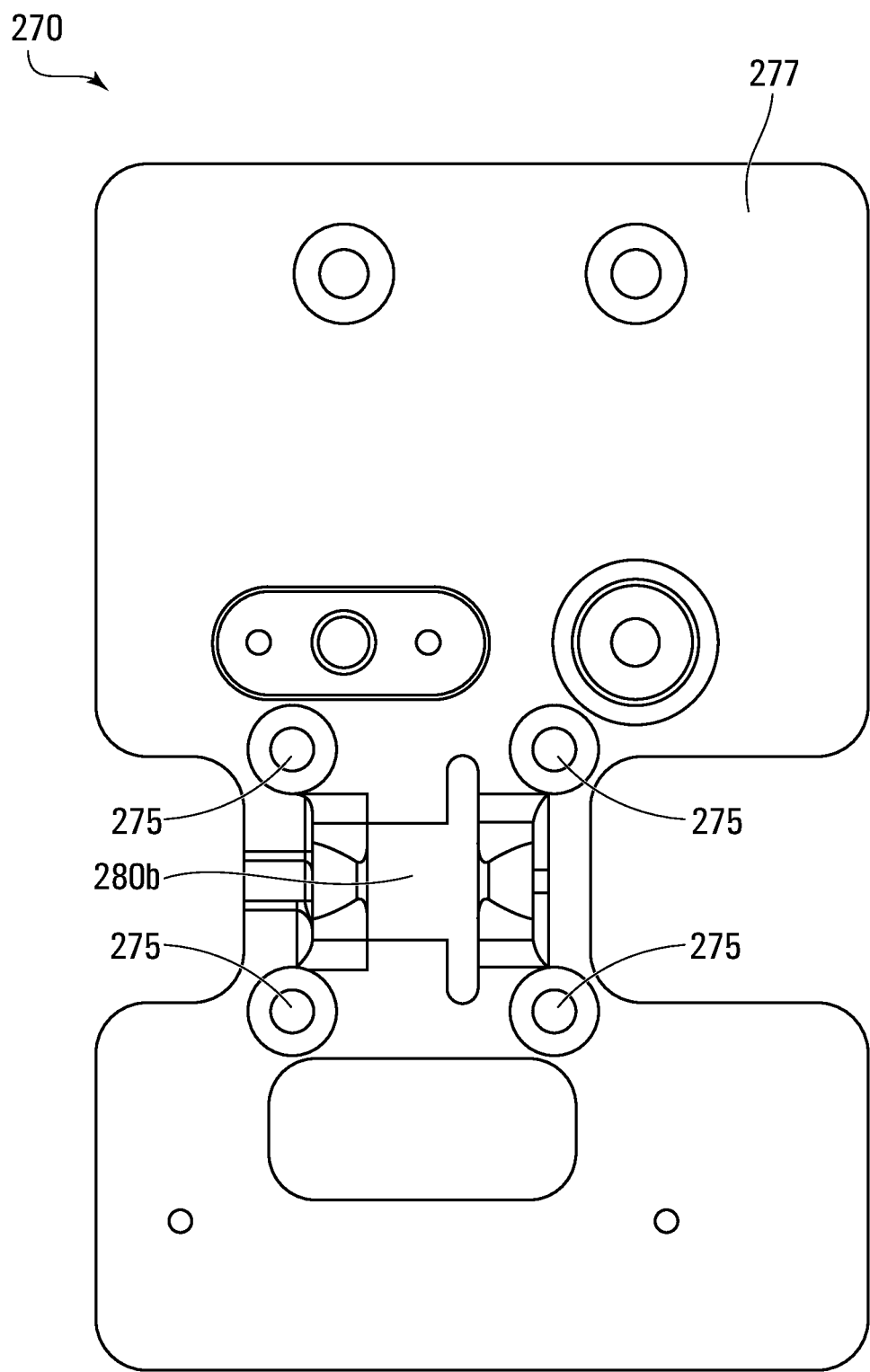
FIG. 4 is a drawing of a top-down view of an exemplary plate of an exemplary bracket.
Figure 5A:
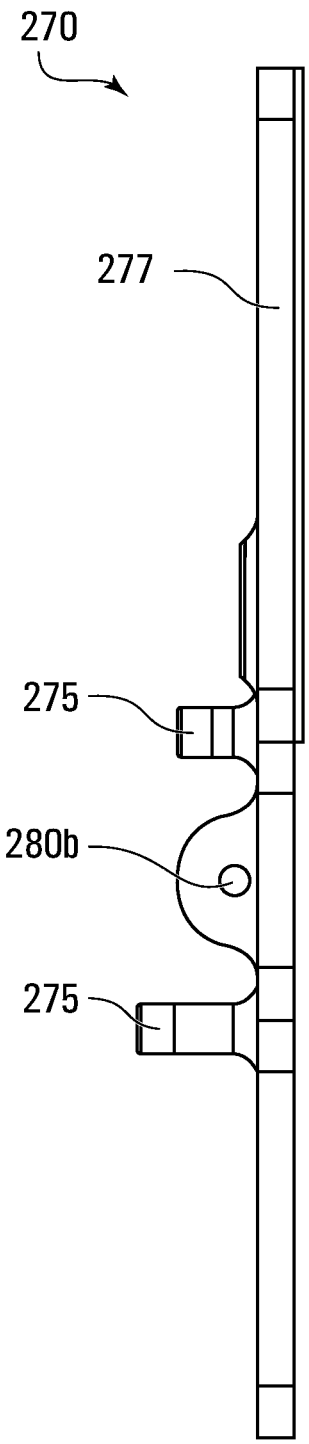
FIG. 5A is a drawing of a left-side view of an exemplary plate of an exemplary bracket.
Figure 5B:
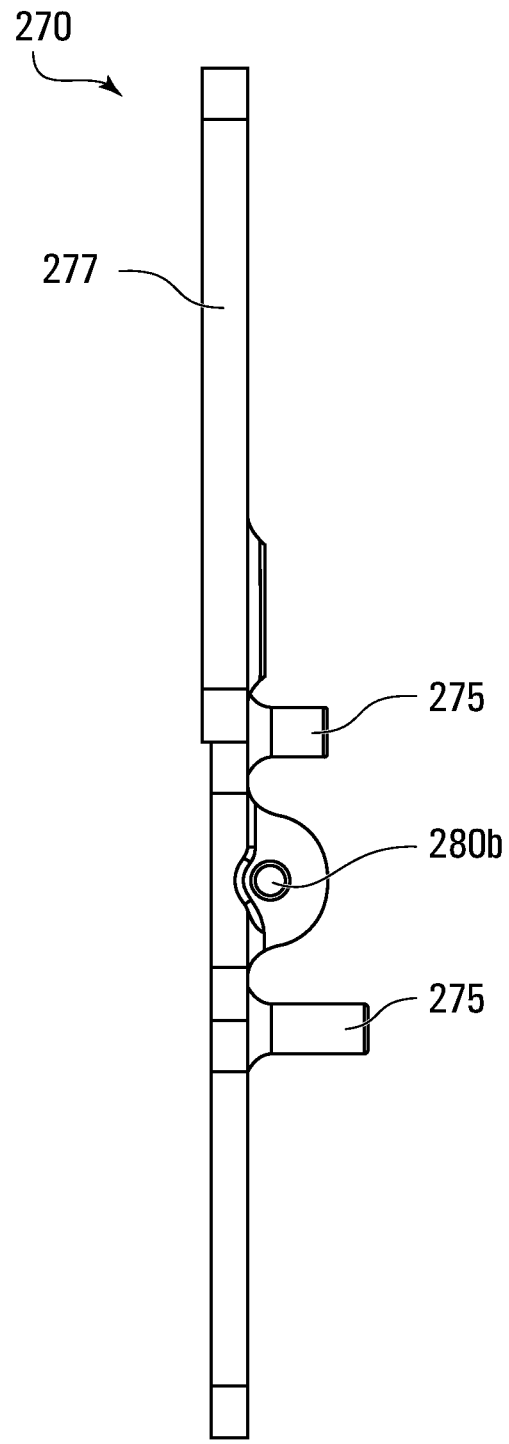
FIG. 5B is a drawing of a right-side view of an exemplary plate of an exemplary bracket.

With reference to FIGS. 4, 5A and 5B, the plate 250 secures the bracket 200 to a flat surface (e.g. wall, ceiling, flat-sided column, etc.) The plate 250 may be a sheet of metal shaped as a parallelogram, or whose shape is dictated by the surface to which the bracket 200 is to be joined. The plate 250 may have a wide top portion, a narrower middle portion for receiving the articulation 280, and a wide bottom portion as shown in FIG. 4.

The plate 250 may include fasteners (e.g. screws, bolts, etc.) or one or more openings for receiving fasteners (e.g. screws, bolts, etc.) for fastening the bracket 200 to the flat surface.

The three or more protrusions 275 may project from the plate 250 as shown in FIGS. 4, 5A and 5B. In the example of FIG. 4, there are four protrusions positioned at respective corners of a parallelogram, forming a parallelogram (e.g. a square). Each of the protrusions 275 may be placed at equidistance from one another. However, in some examples, the distance between each of the protrusions 275 may vary.

Even though FIG. 4 shows there being four protrusions 275, it will be understood that the number of protrusions 275 may vary (i.e. more than 3) without departing from the present teachings. For instance, when there are three protrusions 275, the protrusions 275 may form a triangle. When there are six protrusions 275, the protrusions may form a hexagon.

The position of each of the protrusions 275 with respect to one another may be such that the protrusion 275 form a polygon, where the position of each of the protrusions 275 may correspond to a corner of the formed polygon.

The protrusions 275 may be centered around the articulation 280 as shown in FIG. 4. In other embodiments, the articulation 280 may be offset from the center of the polygon formed by the protrusions 275.

In some embodiments, the protrusions 275 may extend from the surface of the mounting component 270 that is facing the plate 250. In some examples, some of the protrusions 275 may extend from the surface of the mounting component 270 that is facing the plate 250, and other protrusion 275 may extend from the plate 250.

The protrusions 275 are positioned and dimensioned to serve as abutments for the mounting component 270 as the mounting component 270 moves about the articulation 280. When the surface 282 of the mounting component 270 that faces the plate 250 is parallel with the plane defined by the plate, there is space between at least some of the protrusions 275 and the plate 250 (if the protrusions 275 project from surface 282) or between at least some of the protrusions 275 and the surface 282 (if the protrusions 275 project from plate 250). As such, when the mounting component 270 moves about the articulation 280 with respect to the plate 250, the surface 282 of the mounting component 270 comes into contact with one or more protrusions 275, the protrusions 275 thereby restricting movement of the mounting component 270 provided by the articulation 280. The restriction in movement provided by the protrusions 275 define the range of motion provided by the mounting component 270 and a holder 300 that can be joined thereto. This restriction in movement can be particularly useful, for instance, in an aircraft, where a holder with too much freedom of motion could clutter the limited space of an aircraft, or hinder a pilot using the holder in the cockpit by obstructing the pilot's access to certain controls. As such, the protrusions 275 tailor the range of motion granted by the bracket 200 to the holder 300.

The protrusions 275 may be shaped as posts as shown in FIGS. 5A and 5B. In some embodiments, the protrusions 275b may be shaped as mounds (not shown).

The protrusions 275 may be of equal or of different heights, depending on the range of movement sought after for the bracket 200. It will be understood that the height of the protrusion 275 may be tailored as a function of its position with respect to the articulation 280, the space between the plate 250 and the surface 282 of the mounting component 270, the position of the protrusion 275 with respect to the other protrusions 275, and the desired maximum angle of movement to be obtained along a certain axis, using trigonometry.

In some examples, the height of the protrusions 275 may be adjustable (e.g., where the protrusion 275 is a bolt running through the plate 250, with a nut on the side of the plate 250 that is opposite to the one facing the mounting component 270, the height of the protrusion 275 adjustable using the nut) (not shown).

The articulation 280 (e.g. a universal joint, having a double-pivot mechanism) allows for free movement (rotation) along the three axes (x-axis, y-axis, z-axis). As such, the articulation 280 interconnects the plate 250 to the mounting component 270, and allows the mounting component 270 to rotate about the articulation 280 along the three axes, with respect to the plate 250 that is mounted to a flat surface. The movement of the mounting component 270 about the articulation 280 is limited by the protrusions 275 as explained herein.

Figure 6:
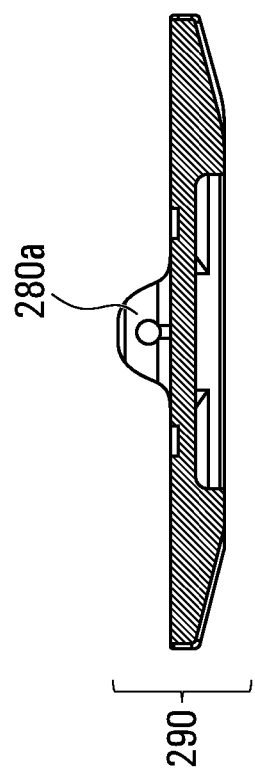
FIG. 6 is a drawing of a cross-sectional view of an exemplary interface of an exemplary mounting component.

In some embodiments, in order to provide for a more compact bracket, it is desirable to reduce the number of parts that compose the bracket. In order to do so, instead of having the articulation 280 as a stand-alone piece, portions of the articulation 280 may be integrated into the plate 250 and the mounting component 270 respectively. A portion of the articulation 280 may form an integral part of the plate 250 or be joined to the plate 250, as shown with portion 280b of FIGS. 5A and 5B. As shown in FIG. 6, a corresponding portion 280a of the articulation 280 may be integrated into an interface 290 of the mounting component 270, where portion 280a and portion 280b can mate and be joined together when forming the articulation 280, e.g., when joined using a tilt bolt.

Figure 8:
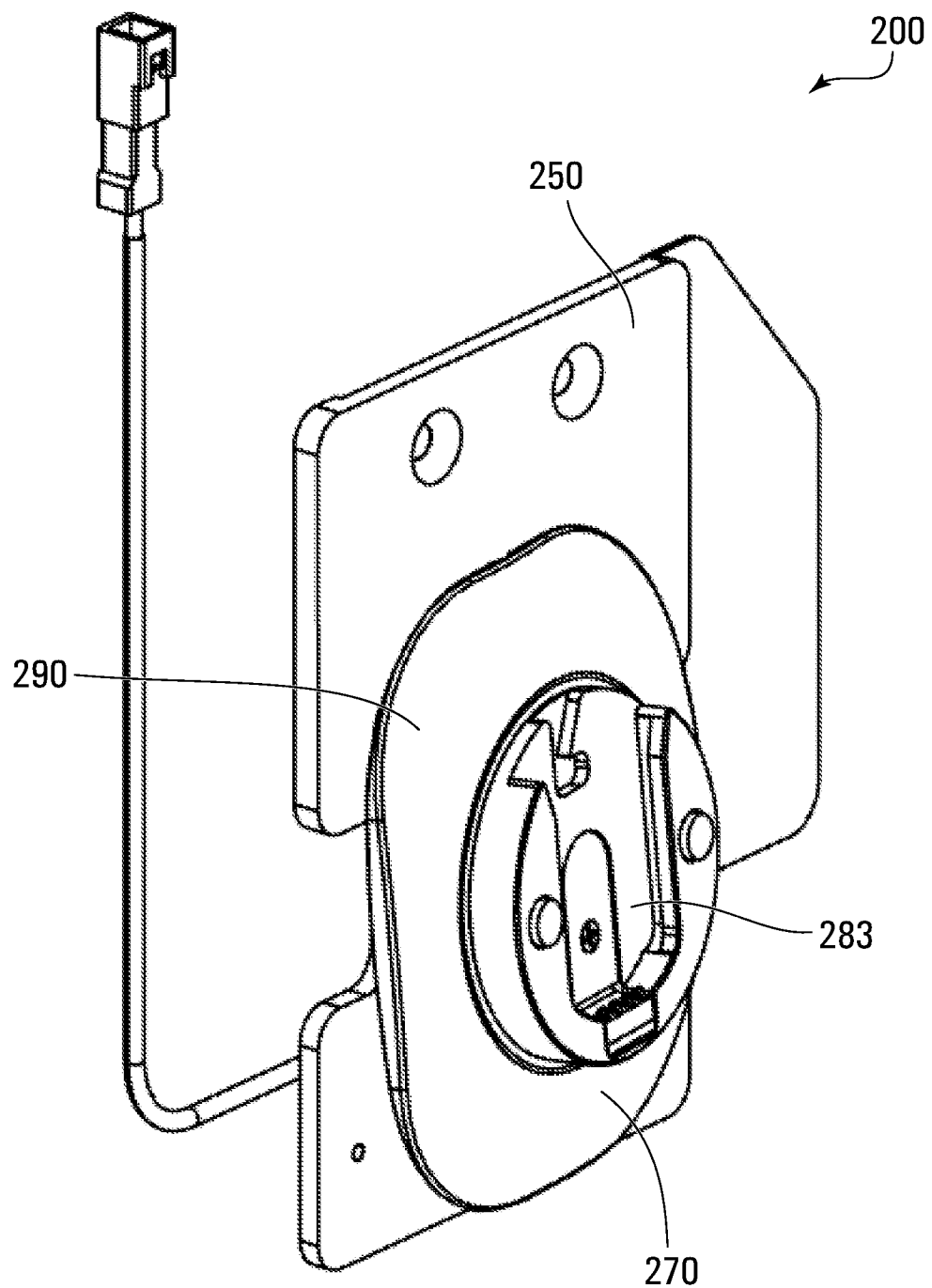
FIG. 8 is a drawing of a perspective view of an exemplary bracket.

The mounting component 270 is a portion of the bracket 200 that connects to the electronic device, or the holder 300 that is to receive the electronic device. The mounting component 270 also rotates along the three axes with respect to the plate 250, its freedom of motion provided by the articulation 280. The mounting component 270 may have a cylindrical shape with a wide base (interface or skirt 290), as shown in FIGS. 3 and 8. However, it will be understood that the shape of mounting component 270 may vary without departing from the present teachings.

As the mounting component 270 is connected to the holder 300 of the electronic device or to the electronic device, movement of the mounting component 270 can cause movement of the holder 300 or of the electronic device. As such, moving the mounting component 270 allows for adjustment of the position of the holder 300 and/or of the electronic device.

The mounting component 270 may be composed of multiple parts (e.g. 1, 2, 3, 4).

As shown in FIG. 8, The mounting component 270 may have a connector with a socket 283 for receiving a corresponding projection of the holder 300. The projection of the holder 300 may be shaped to fit into the socket 4, and to slide into the socket 4, such that the projection of the holder 300 (and the holder 300) is secured to the mounting component 270.

In some embodiments, a portion of the articulation 280 may be integrated to the surface 282 of the mounting component 270.

Figure 7:
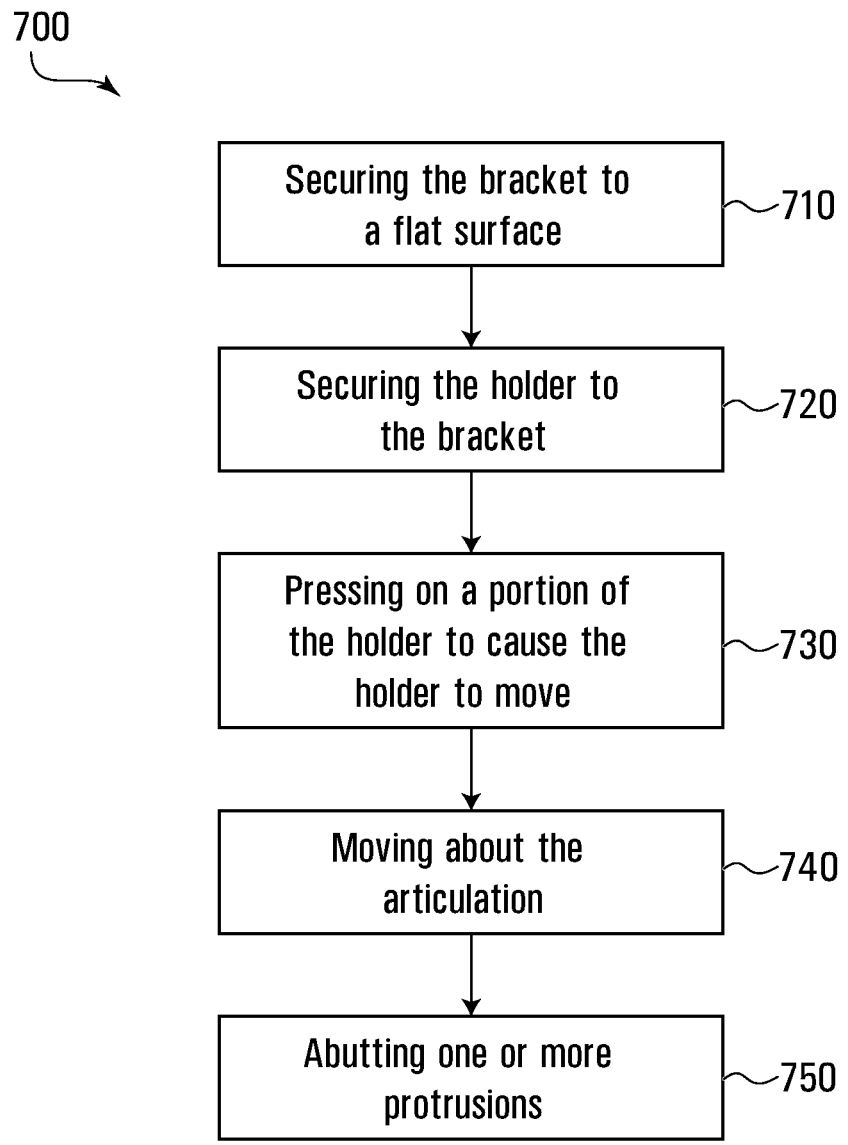
FIG. 7 is a flowchart diagram of an exemplary method of fastening an electronic device to a holder and of adjusting the position of the holder of the support.

An Exemplary Method of Securing an Electronic Device to a Support for an Electronic Device:

Reference is now made to FIG. 7, illustrating an exemplary method 700 of securing an electronic device (e.g. a tablet computer) to a support, e.g., where the support is configured for use in an aircraft, such as in the cockpit of an aircraft.

For purposes of illustration, reference will be made to the support 100 when describing the method 700. However, it will be understood that any support in accordance with the present teachings may be used when performing method 700.

The bracket 200 of the support 100 is secured to a flat surface (e.g. a wall, such as the wall of the inside of an aircraft) at step 710. For instance, the plate 250 of the bracket 200 may be fastened to the wall using bolts or screws that run through the plate 250.

The holder 300 may then be optionally secured to the bracket 200 at step 720. For instance, the bracket 200 may have a socket 283 for receiving a corresponding protrusion of the holder 300, the protrusion of the holder 300 sliding into the socket 283, thereby securing the holder 300 to the bracket 250.

In order to adjust the position of the holder 300 with respect to the plate 250 (e.g. if the user would like to change the position (e.g. angle) of the tablet secured to the holder), the user can exert a force on one of the portions (e.g. corner, side) of the holder 300 in accordance with the direction in which the user would like the holder 300 to be positioned at step 730.

The force exerted by the user causes the holder 300, attached to the mounting component 270, to move about the articulation 280 at step 740. As the articulation 280 provides for freedom of movement along the three axes, depending on where the force is exerted by the user on the holder 300, the holder 300 may tilt downward or upward, rotate clockwise or counter-clockwise, etc.

However, as the mounting component 270 moves about the articulation 280, the surface of the mounting component 270 that faces the plate 250 may come into contact with one or more protrusions 275 that are positioned around the articulation 280. The contacting of the one or more protrusions 275 prevents any further movement of the holder 250 in the direction in which the protrusion 275 is located. As such, the protrusions 275 limit the range of motion of the holder 300, in order to ensure that the support 100 accommodates the space in which it is installed and does not move to such a degree that the support 100 hinders the access of the user to, e.g., controls of the aircraft.

It will be understood that the holder 300 may be securing a tablet computer or another electronic device.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A bracket for mounting to a flat surface comprising:
a plate for fastening to the flat surface through a use of fasteners;
a mounting component for fastening, at a first surface of the mounting component, to:
a holder for an electronic device; or
the electronic device;
an articulation interconnecting the plate and the mounting component at a second surface of the mounting component opposite the first surface, the articulation allowing for movement of the mounting component with respect to the plate along three axes;
at least three protrusions located between the plate and the mounting component and projecting from at least one of the plate and the second surface of the mounting component, wherein the at least three protrusions form a polygon around the articulation, and wherein at least one of the plate and the mounting component abuts one or more of the at least three protrusions through movement of the articulation, the at least three protrusions restricting range of motion of the mounting component provided by the articulation along the three axes.

2. The bracket as defined in claim 1, wherein the at least three protrusions project from the plate.

3. The bracket as defined in claim 2, wherein there is a space between each of the protrusions of the at least three protrusions and the second surface of the mounting component when the second surface of the mounting component is parallel with the plate.

4. The bracket as defined in claim 1, wherein one of:
the at least three protrusions has three protrusions that form a triangle surrounding form the articulation; and
the at least three protrusions has four protrusions that form a parallelogram sounding the articulation.

5. The bracket as defined in claim 1, wherein the polygon formed by the at least four protrusions is centered around the articulation.

6. The bracket as defined in claim 1, wherein the at least three protrusions are posts.

7. The bracket as defined in claim 6, wherein at least two of the at least three protrusions are posts having a different height.

8. The bracket as defined in claim 1, further comprising the fasteners for fastening the plate to the flat surface.

9. The bracket as defined in claim 1, wherein the articulation is a universal joint.

10. The bracket as defined in claim 1, wherein the mounting component is for fastening, at the first surface of the mounting component, to the holder for an electronic device.

11. An electronic device support comprising:
the bracket as defined in claim 10; and
a holder for receiving and securing an electronic device attached or attachable to the first surface of the mounting component of the bracket, wherein movement of mounting component about the articulation causes the holder to move respectively.

12. The electronic device support as defined in claim 11, wherein the holder comprises:
a movable jaw; and
a fixed jaw,
wherein the movable jaw and fixed jaw form a space for receiving a tablet, and wherein the movable jaw can be adjusted to fix the tablet between the movable jaw and the fixed jaw.

13. The electronic device support as defined in claim 12, wherein the at least one of the movable jaw and the fixed jaw comprises an opening at a side of at least one of the movable jaw and the fixed jaw that is closest to the tablet to not cover a camera lens of the tablet.

14. The electronic device support as defined in claim 11, wherein the holder is detachable from the bracket.

15. The electronic device support as defined in claim 14, wherein the first surface of the mounting component comprises a slot for receiving a corresponding projection, where the projection slides into the slot of the mounting component to secure the holder to the mounting component.

16. A method of securing a tablet holder to a bracket that controls a range of motion of the tablet holder in at least one of three axes comprising:
securing the tablet holder to a socket of a mounting component of the bracket;
adjusting the position of the tablet holder by exerting a force on the tablet holder, wherein the force causes the tablet holder, connected to the mounting component, to move in accordance with a direction of the force as a result of an articulation connected to the mounting component, wherein the moving of the tablet holder is limited by abutting one or more protrusions that limit motion of the tablet holder.

17. The method as defined in claim 16, wherein the protrusions project from a plate to which the mounting component is connected through the articulation, and wherein the moving of the tablet holder is limited by the abutting of a surface of the mounting component that faces the plate against the one or more protrusions.

18. The method as defined in claim 16, wherein the protrusions limit movement of the tablet holder along each of the three axes.

19. The method as defined in claim 16, further comprising clamping the tablet to the tablet holder using a fixed clamp and a movable clamp of the tablet holder, wherein one of the fixed clamp and the movable clamp provides a space for accommodating a camera lens of the tablet, such that the one of the fixed clamp and the movable clamp does not obstruct the camera lens.

20. The method as defined in claim 16, wherein protrusions are of different heights, thereby resulting in different ranges of motions of the tablet holder in each of the three axes.

* * * * *